(12) United States Patent
Aman

(10) Patent No.: US 7,519,962 B2
(45) Date of Patent: Apr. 14, 2009

(54) COMMAND SCRIPT PARSING USING LOCAL AND EXTENDED STORAGE FOR COMMAND LOOKUP

(75) Inventor: Philip John Aman, Chicago, IL (US)

(73) Assignee: Thomson Financial LLC, New York, NY (US)

( * ) Notice: Subject to any disclaimer, the term of this patent is extended or adjusted under 35 U.S.C. 154(b) by 529 days.

(21) Appl. No.: 10/960,218

(22) Filed: Oct. 7, 2004

(65) Prior Publication Data

US 2006/0080646 A1    Apr. 13, 2006

(51) Int. Cl.
*G06F 9/45* (2006.01)
(52) U.S. Cl. .................... 717/143; 717/142
(58) Field of Classification Search .......... 717/141–144
See application file for complete search history.

(56) References Cited

U.S. PATENT DOCUMENTS

| | | | |
|---|---|---|---|
| 5,428,737 A | 6/1995 | Li et al. | |
| 5,634,053 A | 5/1997 | Noble et al. | |
| 5,706,501 A | 1/1998 | Horikiri et al. | |
| 5,778,358 A | 7/1998 | Blackman et al. | |
| 5,794,250 A | 8/1998 | Carino, Jr. et al. | |
| 5,826,077 A | 10/1998 | Blakeley et al. | |
| 5,864,843 A | 1/1999 | Carino, Jr. et al. | |
| 5,873,083 A | 2/1999 | Jones et al. | |
| 5,987,455 A | 11/1999 | Cochrane et al. | |
| 6,009,422 A * | 12/1999 | Ciccarelli | 707/4 |
| 6,134,709 A | 10/2000 | Pratt | |
| 6,157,923 A | 12/2000 | Ivler et al. | |
| 6,157,928 A | 12/2000 | Sprenger et al. | |
| 6,285,998 B1 | 9/2001 | Black et al. | |
| 6,292,800 B1 | 9/2001 | Eldreth | |
| 6,308,168 B1 | 10/2001 | Dovich et al. | |
| 6,356,887 B1 | 3/2002 | Berenson et al. | |
| 6,366,915 B1 | 4/2002 | Rubert et al. | |
| 6,397,383 B1 | 5/2002 | Chang et al. | |
| 6,421,656 B1 | 7/2002 | Cheng et al. | |
| 6,460,041 B2 | 10/2002 | Lloyd | |
| 6,466,934 B2 | 10/2002 | Seese et al. | |

(Continued)

OTHER PUBLICATIONS

Varadarajan et al., "SASE: Implementation of a Compressed Text Search Engine", USENIX Symposium on Internet Technologies and Systems, pp. 1-11, Dec. 1997.*

*Primary Examiner*—Ted T Vo
(74) *Attorney, Agent, or Firm*—Greenberg Traurig, LLP

(57) ABSTRACT

A method for parsing and verifying the contents of a command script containing a token and written in a scripting language. A first, relatively rapidly accessible data store and a second, less rapidly accessible data store are provided. Each data store contains function signature definitions which include a function name and an associated parameter list of zero or more parameter specifications. The first data store contains function names associated with commands that do not require data retrieval for completion. The second data store contains function names associated with commands that, unlike those in the first data store, do require data retrieval for completion. A potential function name and its associated arguments, if any, are recognized within the token. The first data store is searched for a matching function signature, having a function name matching the potential function name, and a parameter list matching the parsed potential function arguments. If no match is found, the second data store is then searched in a similar manner for a matching function signature.

17 Claims, 5 Drawing Sheets

U.S. PATENT DOCUMENTS

| | | |
|---|---|---|
| 6,523,172 B1 | 2/2003 | Martinez-Guerra |
| 6,526,403 B1 | 2/2003 | Lin et al. |
| 6,535,874 B2 | 3/2003 | Purcell |
| 6,601,065 B1 | 7/2003 | Nelson et al. |
| 6,684,204 B1 * | 1/2004 | Lal .............................. 707/3 |
| 6,738,781 B1 * | 5/2004 | Mustoe et al. .............. 707/102 |
| 2002/0023091 A1 | 2/2002 | Silberberg et al. |
| 2002/0049685 A1 | 4/2002 | Yaginuma |
| 2002/0103811 A1 | 8/2002 | Fankhauser et al. |
| 2002/0198876 A1 * | 12/2002 | Zielinski et al. ................ 707/4 |
| 2003/0061205 A1 | 3/2003 | Cleghorn et al. |
| 2003/0115190 A1 | 6/2003 | Soderstrom et al. |
| 2003/0126114 A1 | 7/2003 | Tedesco |
| 2003/0177111 A1 | 9/2003 | Egendorf et al. |

* cited by examiner

TICKER_LIST(IBM)<||>CA_SALES(5/24/04, OCY, M)<||>SLOPE10(CQ_EPS(0,-10))<||>END_BUNDLE

400

500

COMMAND SCRIPT PARSING USING LOCAL AND EXTENDED STORAGE FOR COMMAND LOOKUP

BACKGROUND OF THE INVENTION

1. Field of the Invention

The present invention relates in general to scripting languages and associated parsers, and, more particularly, to the parsing of command scripts into a format that can be queried against relational databases.

2. Background and the Prior Art

Query parsers, which process user queries written in a language that is not a database language into one or more queries understandable to database server software, such as relational database server software, have been known in the art for years. These parsers typically translate user's command script to one or more database query commands using a database query language, such as the well-known Structured Query Language (SQL).

Noble et al., U.S. Pat. No. 5,634,053 discloses the filtering of a global database query into a plurality of local sub-queries to search for and retrieve data from the individual databases referenced by the global query.

Cochrane et al., U.S. Pat. No. 5,987,455, is directed to querying a database, wherein the query contains a procedural function. The query is compiled to generate an internal representation of this procedural function, and the execution of the procedural function is optimized, using the internal representation.

Jones et al., U.S. Pat. No. 5,873,083 discloses the use of a grammar definition to generate a high-level collection of object structures, which are optimized and converted into a query execution plan.

Martinez-Guerra et al., U.S. Pat. No. 6,523,172 discloses a parser-translator which uses grammar translation rules in conjunction with statement parsing, in order to dynamically interface with data stores.

While these and other prior art database parsers have worked well, it is desirable to provide a database command parser that includes a hierarchical, multi-stage command lookup feature, wherein a limited set of commands that are operational in nature and do not require data retrieval for completion are recognized natively by the command parser, using local, relatively rapidly accessible storage, and wherein a substantially larger set of functions that require data retrieval, as well as user-defined functions, are recognized in conjunction with a secondary, less rapidly accessible data store.

It is further an object of the present invention to provide a database command parser that is capable of receiving and processing command scripts from a variety of sources, including off-the-shelf business applications, web browsers, and custom-built applications.

It is additionally an object of the present invention to provide a scripting language and an associated command parser which facilitates the creation of user-defined functions, or extensions to the command language, including user-defined functions that allow their callers to change or rewrite the run-time interpretation of a user-defined function "on the fly."

It is yet another object of the present invention to provide a flexible date engine that, in association with a parser and a scripting language, permits users to specify dates for which data is to be retrieved from a relational database in a variety of ways, including relative date specifications and periodic date intervals.

These and other desirous characteristics of the present invention will become apparent in light of the present specification, claims, and drawings.

SUMMARY OF THE INVENTION

The present invention is directed to a computerized method for parsing and verifying the contents of a command script submitted for execution. Such command scripts may be submitted, for example, in the context of a database querying and retrieval system having a client-server architecture. In a preferred embodiment, the parsing and verifying of the contents of the command script submitted for execution includes providing a command script including at least one token and written in a scripting language. A first, substantially rapidly-accessible data store contains at least one primary function signature definition. This primary function signature definition includes a primary function name that associated with an operational command that does not require data retrieval for completion, as well as a primary parameter list associated with the primary function name and having zero or more parameter specifications.

Moreover, there is provided a second data store that is less substantially rapidly-accessible than the first data store. This second data store contains at least one secondary function signature definition which, in turn, includes a secondary function name which is either associated with a command that does require data retrieval for completion, and/or is associated with a user-defined function. The secondary function signature definition also includes a secondary parameter list associated with the secondary function name, having zero or more parameter specifications.

The parser will recognize at least one portion of the token to potentially represent a reference to a previously defined function in the scripting language. This potential function reference has a potential function name and zero or more associated potential parameters. Next, the parser will search the first data store for a matching primary function signature definition corresponding to the potential reference to a previously defined function. A match is deemed to occur if a primary function signature definition is found which has a primary function name matching the potential function name and each of the potential parameters has a matching entry in the primary parameter list associated with the same primary function signature definition.

If a matching primary function signature is found in the first data store, the function reference in the command script is considered valid, and no further searching is necessary. Otherwise, a similar search for the potential function is performed again, this time in the second data store. In particular, the second data store is searched for a matching secondary function signature definition having a secondary function name matching the potential function name, and wherein each of the potential parameters has a matching entry in the secondary parameter list associated with the same secondary function signature definition. If a matching entry is found in the second data store, the function reference in the command script is considered valid. Otherwise, an invalid function reference, or a syntax error, is deemed to have occurred.

In a preferred embodiment, the command script is received from a client application. Also, in a preferred embodiment, an execution plan is created which includes the scheduled execution of a function name determined to match the potential function name. During the performance of the execution plan, resulting data retrieved from a relational database is assembled into a results set. This results set is stored in association with a result set identifier on a result server. The client application is provided with the result set identifier, together with an identification of the result server. The client application submits a request for the result set which is then transmitted to the client from the results server in response to this request.

The first data store and the second data store, in a preferred embodiment, reside on separate computers which are interconnected by a communications network. In one preferred embodiment, the client application submitting the command script includes a spreadsheet program. In another preferred embodiment, the client application includes a web browser. In yet another preferred embodiment, the client application includes an application programming interface for constructing and submitting the command string for execution in response to calls made to functions exposed by the application programming interface.

Also, in a preferred embodiment, the reference to a previously defined function is a reference to a previously defined user-defined function. In another preferred embodiment, this reference is instead a reference to a previously defined function that is native to the scripting language.

Moreover, in a preferred embodiment, the at least one token includes a plurality of tokens, which are deconstructed into constituent components, which are then arranged into an object hierarchy.

The present invention also includes a computerized method for providing a user-extensible scripting language. A user-defined function written in the scripting language is stored in a data store. This user-defined function including at least one parameter associated therewith, and a body portion including at least one substitution symbol indicating that the value of the at least one parameter is to be inserted as text in place of the substitution symbol. A function signature, identifying characteristics of the user-defined function, is stored in the data store. This function signature includes the name of the user-defined function and a specification of the at least one parameter.

A command script written in the scripting language is recognized as including a token containing a reference to the user-defined function and at least one parameter value associated therewith. A copy of the body portion of the user-defined function that is referenced in the command string is retrieved. The at least one substitution symbol is replaced within the copy by the at least one parameter value of the token.

Next, the body of the copy of the user-defined function is reinterpreted using the scripting language. Essentially, the parser makes an additional interpretive pass over the altered copy. Following this reinterpretation, the body of the copy of the user-defined function is recognized to include a token comprising a reference to a function which was not present in the body of the user-defined function in the data store. In this manner, a run-time interpretation of the user-defined function is altered to include an invocation of a function that was not contained within the previously stored user-defined function.

Also, in a preferred embodiment, the at least one parameter of the user-defined function includes a first parameter and a second parameter. The at least one substitution symbol of the user-defined function includes a first substitution symbol and a second substitution symbol, indicating that the values of the first and second parameters are to be inserted as text in place of the first and second substitution symbols, respectively.

In this preferred embodiment, the specification of the at least one parameter in the function signature includes a specification of the first and second parameters. In addition, the at least one parameter value associated with the recognized token includes a first parameter value and a second parameter value. Moreover, the first substitution symbol within the copy is replaced with the first parameter value of the token and the second substitution symbol within the copy is replaced with the second parameter value of the token. In this manner, a run-time interpretation of the user-defined function is altered to include an invocation of a function, where at least a portion of the name of the invoked function includes the first parameter value and the second parameter value.

DETAILED DESCRIPTION OF THE INVENTION

Figure 1:
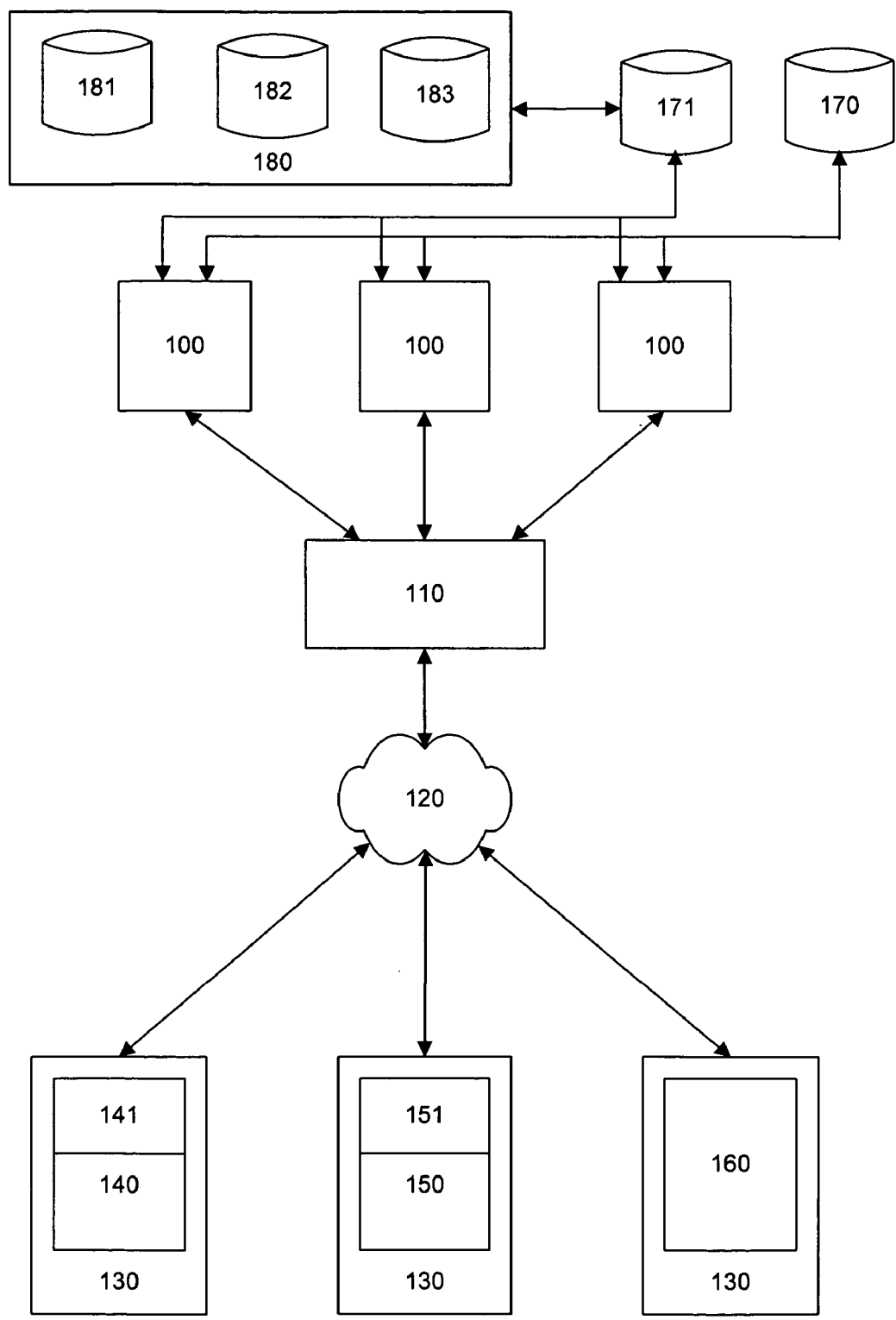
FIG. 1 of the drawings is a block diagram of an overall client-server based command script parsing and data retrieval system, according to the present invention.

While this invention is susceptible of embodiment in many different forms, there are shown in the drawings and will be described in detail, several specific embodiments, with the understanding that the present disclosure is to be considered as an exemplification of the principles of the present invention and is not intended to limit the invention to the embodiments illustrated.

A block diagram of an overall client-server based command script parsing and database query and retrieval system, incorporating the present invention, is shown in FIG. 1 as including a plurality of personal computers 130. As shown in FIG. 1, these personal computer clients may submit data requests, in the form of command strings comprising a command script containing a series of function references written in a scripting language, in a number of different manners. For example, a web browser 160 may be employed, using a combination of hypertext mark-up language (HTML), a native scripting language, such as JavaScript or VBscript, and third-party plug-ins associated with web browser 160, and containing an Application Programming Interface (API), in conjunction with user-supplied data and selections, in order to generate an overall command string for submission, and to submit the command string for execution.

Alternatively, personal computer 130 may use a commercial, off-the-shelf business application 150, in conjunction with a third-party plug-in 151, in order to generate the command string. In one preferred embodiment of the present invention, commercial application 150 comprises the Microsoft Excel® spreadsheet. As is known in the art, the functionality of spreadsheet 150 is extended by plug-in 151 which makes function calls to the API, in order to construct and submit for execution command scripts based upon user input within spreadsheet cells. Other business applications, such as the Microsoft Access® database application, may alternatively be used.

Alternatively, personal computer 130 may include a custom, in-house software application 140, operating in conjunction with API 141. API 141 may be supplied, for example, in the form of a dynamic link and load (DLL) library, a component object model (COM) object, or a vendor-supplied source code library which may be compiled directly with custom software application 140. The API comprises a uniform, predefined interface from which custom software application 140 may construct and submit command strings via a series of calls to functions exposed to callers by the API interface. While plug-in 151 also references this API, the complexity of the API is shielded from the business application user.

A network connection 120 couples personal computers 130 to router 110. In a preferred embodiment, network 120 comprises a relatively high speed Internet-based connection, permitting personal computers 130 to be remotely located, relative to the remaining portions of the overall command parsing and database querying system. Router 110 routes message packets containing command strings received via network connection 120 from personal computers 130 to one or more web servers 100. Router 110 also routes responses from web servers 100 back to the appropriate personal computer. In addition, router 110 may incorporate an integral firewall, protecting web servers 100 from attacks via the external network. Alternatively, a separate firewall may be interposed between the router and the external network connection.

Web servers 100 include a software application, for parsing and then executing the command scripts, or command strings that are received. This software application may include a conventional, industry-standard web service interface, such as an XML web service interface, facilitating the submission of command strings from any authenticated remote device capable of accessing such a standard web service, including web browser 160, commercial application 150, via plug-in 151, and in-house application 140 via API 141. Alternatively, a proprietary web service interface may be used.

Each web server 100 includes a command parser, which parses incoming command strings, in conjunction with secondary function database 170. Moreover, for final execution of the fully parsed command string, the command parser submits requests in the form of data queries to query processing database 171. Query processing database 171, in turn, performs data draws from read-only database server 180. In a preferred embodiment, the secondary function database server, query processing database server and read-only database server all use a commercially-available relational database software package, such as Microsoft SQL Server®.

While FIG. 1 illustrates a preferred layout of an overall command submission, parsing and data retrieval system, other physical configurations are also contemplated, as is known in the art. For example, computers 130 may comprise handheld computing devices, mini-computers or mainframe computers, rather than personal computers. Moreover, network 120 may comprise a local area network, or a wide area network, rather than the Internet. Network 120 may also comprise a wireless network. While a plurality of web servers 100 are contemplated, in the form of a scalable server cluster or "web farm," a single web server may alternatively be used.

Moreover, while the secondary function, query processing and read-only databases are shown in FIG. 1 as being hosted on two physically separate computers, they may, alternatively, reside on a single computer. Indeed, the database servers and web servers may all reside within a single computer, or the database servers, web servers and client computers 130 may alternatively all be condensed into a single, unitary computer system, eliminating the need for a network entirely. Moreover, although relatively sophisticated means for the construction and submission of command scripts in conjunction with an API are shown in FIG. 1, they may, alternatively, be submitted in a more direct manner, such as by direct user input in a plain-text format.

Figure 2:
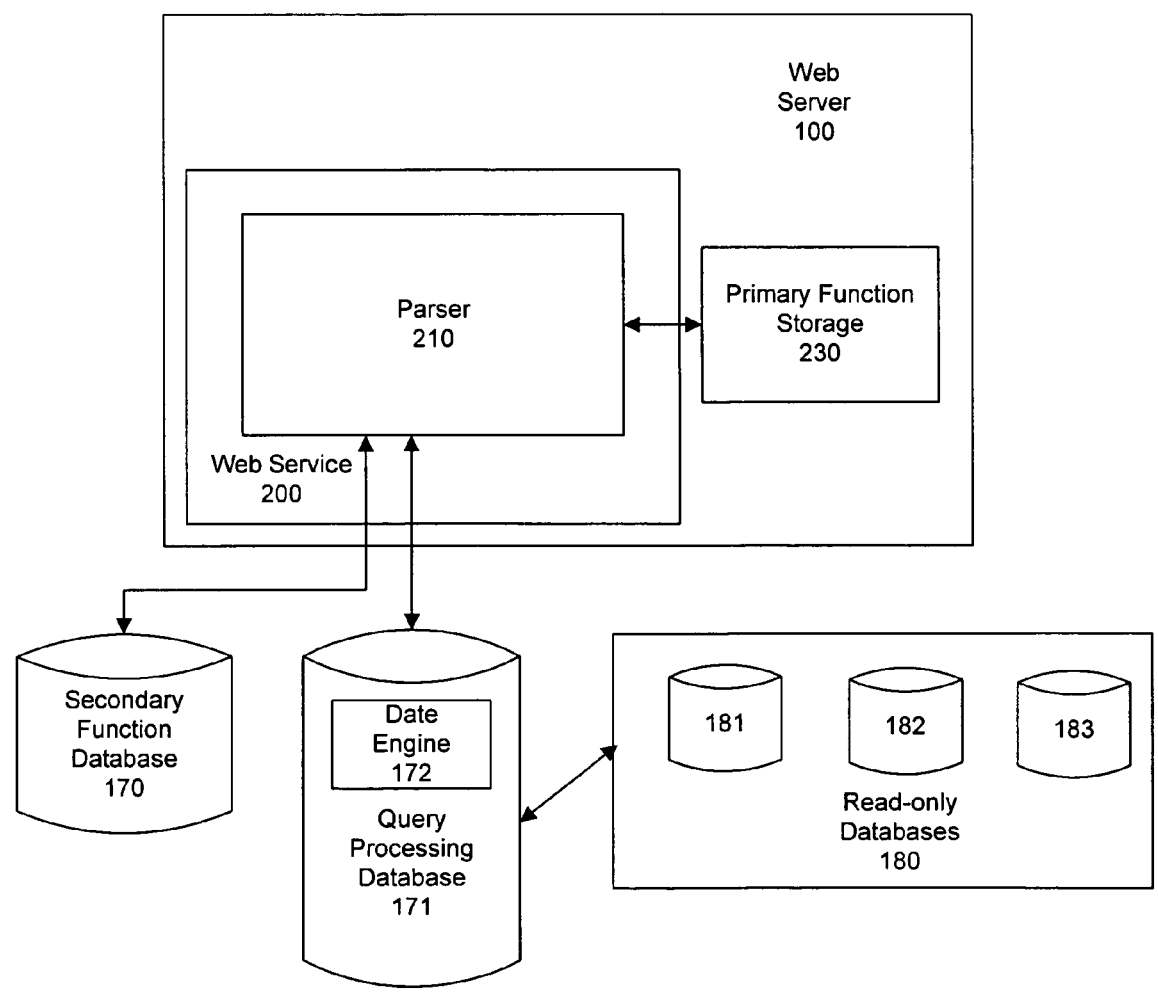
FIG. 2 of the drawings is a block diagram of the web server of FIG. 1 showing, in particular, the parser's usage of a primary local function storage and a secondary function database.

FIG. 2 shows web server 100 in further detail, as including web service 200. Web service 200 in turn includes command script parser 210. As shown in FIG. 2, the command parser also accesses local function storage 230, which is preferably located within the web server. Moreover, the command parser also accesses the secondary function database 170, as well as query processing database 171 which, in turn, accesses read-only database server 180. Query processing database 172 also includes date engine 172, which is accessed by command parser 210. As shown in FIGS. 1 and 2, read-only database 180 may comprise data from a plurality of data sources, such as data sources 181,182, and 183. While these data sources may reside in separate, physical databases hosted by third-parties or on separate databases within the read-only database server, data from these diverse sources are preferably combined and normalized into a common unitary database format. This normalization of data from diverse sources is highly desirable when querying complex financial data from multiple sources. In particular, the normalized data can generally be accessed far more rapidly, as the requests generated by the parsed command strings need not be formatted "on the fly" in order to access data that would otherwise be stored in a variety of different table structures, but can instead query a single, more uniform source. Primary function storage 230 preferably contains function definitions only for commands which are operational in nature, such as adding, subtracting, ranking and grouping and which do not require any data retrieval for completion. Secondary function database 170 preferably contains function definitions only for commands which, unlike those stored within primary function storage 230, do require data retrieval for completion.

Figure 3:
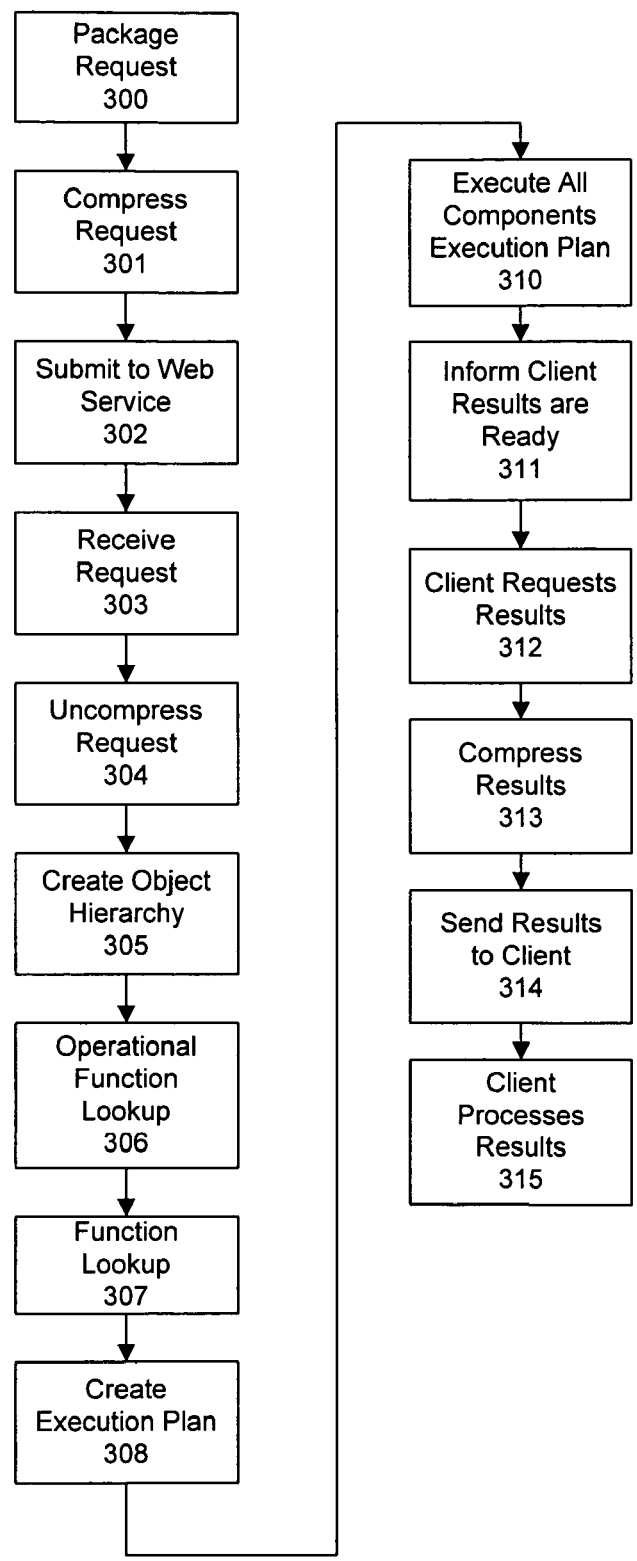
FIG. 3 of the drawings is a process flow diagram of the command parsing and database retrieval functions of the present invention.

A flow diagram, illustrating the major steps involved in issuing the command script, or command string from the client, receiving and parsing the request at the web server, executing the request, typically including performing one or more data draws from the read-only database, making the results available to the client, and retrieving the results by the client is shown in FIG. 3. First, as shown in step 300, client software including a custom application and the API, spreadsheet and associated plug-in, or browser application, assembles the various information requested by the user into a command script comprising a sequence of function calls written in a scripting language, and packages the command script into an overall request. The client next compresses that request in step 301, to achieve a more rapid transmission of data to the web server. Next, in step 302, the compressed request is submitted to the web service. In a preferred embodiment, wherein the Internet is used to connect the client computers to the web servers, the compressed request is submitted in the form of one or more TCP/IP packets.

Figures 4, 5:
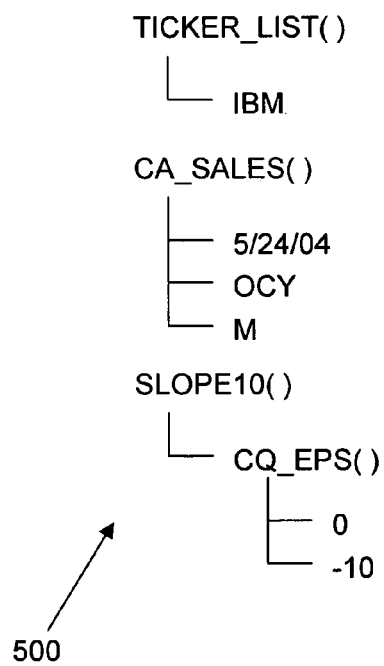
FIG. 4 of the drawings is an example of a command script.
FIG. 5 of the drawings is a tree diagram, showing the parsing of the example command script of FIG. 4 in an object hierarchy.

In step 303, the client request is received by a web server. If, as in a preferred embodiment, a "web farm," or server cluster, is employed, an initial web server may initially receive the incoming request, and assign it for subsequent processing to a particular web server within the cluster. Next, in step 304, the web server that is ultimately assigned to handle the request uncompresses the incoming request, performing the inverse of the compression operation performed by the client in step 301. Once the incoming request is uncompressed, the command script, or command string contained therein is ready for processing. First, as shown in step 304, the command string submitted by the client is broken down into an object hierarchy. A sample command string is shown in FIG. 4, and the decomposition of the elements of this command string to an object hierarchy is shown in FIG. 5. Referring to FIG. 4, the sample command string is shown as comprising a sequence of individual tokens, separated by delimiters. In the example of FIG. 4, each delimiter comprises a sequence of four characters: a "less than" character, two vertical bar characters, and a "greater than" character. Although, in the example of FIG. 4, a custom delimiter is shown, and industry standard format, such as the extensible mark-up language (XML), may alternatively be used. The final token shown in FIG. 4, END_BUNDLE, is employed to demarcate the end of a set of commands associated with a bundle. A bundle is a set of results which apply to the same set of financial symbols, or other form of data being queried. Although, in the example of FIG. 4, the command string includes a single bundle, the parser is capable of accepting multiple bundles, sequentially within a single command string.

FIG. 5 shows in detail how the command string 400 of FIG. 4 is broken down into an object hierarchy 500. As shown in FIG. 5, the first token of FIG. 4 is broken down into a potentially valid function reference named TICKER_LIST( ), and, on a second tier below this potential function the string literal IBM, recognized as a parameter, or argument to the potential function. Similarly, the second token in the command string of FIG. 4 is shown in FIG. 5 as being constructed into an object having a first tier comprising the potentially valid function reference CA_SALES( ), and three items on the second tier: a date-formatted value of 5/25/04, and the string literals ocy and m. The third token in the example command string is broken down into an object with three tiers: a first tier comprising the potentially valid function reference named SLOPE( ); a second tier comprising the potentially valid function reference named CQ_EPS( ); and a third tier including the numeric values of 0 and −10.

Figure 6:
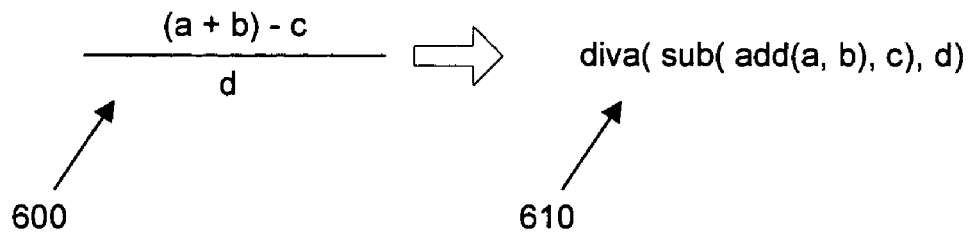
FIG. 6 of the drawings is an illustration of the symbol resolution phase of the command parsing.

Referring back to FIG. 3, following the creation of an object hierarchy, the next step in processing the command string is operational function lookup 306. The first part of operational function lookup is to resolve symbols known natively, or locally, to the parser. These include commands that are operational in nature, such as, for example, those relating to addition, subtraction, ranking and grouping, as well as symbols, such as mathematical symbols, that are resolved to corresponding native functions. An example of the resolution of arithmetic symbols to associated mathematical functions is shown in FIG. 6. A mathematical formula 600, including arithmetic operators applied to string literals, is shown. In this example, the string literals, or variables, are represented by the letters a, b, c, and d. The mathematical formula shows the addition of a+b, the subtraction of c from this sum, and the division of this resultant intermediate value by d. On the right hand side of FIG. 6, these symbols are resolved by rewriting the associated portion of the command script and replacing the symbols with appropriate corresponding function references. As shown in FIG. 6, the resolved symbols 610 included three nested functions. The innermost, "add" function, is applied to variables a and b. The next outer function, "sub", is applied to the addition function and the variable c. The outermost function, "diva", the division function, is applied to the result of the "sub" function, together with variable d.

During this symbol resolution phase, preliminary error checks are performed, and further processing of the command script may be rejected if a syntax error is encountered. When the operational function lookup step has completed, the object hierarchy has been partially rewritten, with appropriate function references replacing known symbols. In addition, those functions that are operational in nature and hence known locally to the parser are also resolved at this time. This is achieved by consulting the relatively rapidly accessible local function storage 230 of FIG. 2, in order to determine whether each function specified in the command string, and placed within an appropriate position in the object hierarchy, is a locally known function.

In the example command script of FIG. 4, TICKER_LIST( ) is a native or local operational function, whose associated parameter; in this case, the symbol IBM, indicates that the subject of the associated query, as a whole, relates to retrieving financial information pertaining to the trading of shares, earnings, dividends, etc., in stock in the International Business Machines Corporation (i.e., a selected item from a stock ticker). Moreover, in the example command script of FIG. 4, the function SLOPE10( ) is also a function stored in local function storage and natively known to the parser, indicating that the analytical function slope, or rate of change over time, is to be determined using data considered over ten day increments. These and other functions that are commonly used in the general field relating to the user's query, and anticipated to occur relatively frequently within submitted command scripts, are preferably likewise made to be functions that are natively known to the parser.

As is known in the art, this local, relatively high speed lookup may be performed in a number of different ways. For example, the locally known function names may be stored in a relatively small file and on a local hard disk, or may be within local random access or read-only memory. Function names may be stored sequentially, in alphabetically ordered tables facilitating sequential searching. Alternatively, the function names may be indexed for more rapid location and retrieval. Data may be structured for rapid retrieval in a binary tree, a balanced tree, or a multi-way tree, facilitating a binary search or other b-tree search method. Moreover, as is known in the art, a rapid memory access technique such as hashing, may be used to rapidly determine whether the specified function name exists within the local function storage. Specialized search-accelerating hardware, such as content addressable memory, may also be employed. In a preferred embodiment, approximately 300 to 400 functions may be considered commonly used, and stored within this local function storage.

Each locally known function, operational in nature and stored in local memory and rapidly accessible by the parser, is, in a preferred embodiment, stored in the local function storage together with additional descriptive information, in the form of a function signature. Moreover, functions which relate to or involve data retrieval and are not locally known, are stored in the secondary function database in association with a function signature. Whether relating to the operational functions in local storage or the data retrieval functions in the secondary function database, each function signature contains descriptive information, identifying both the name of the function and characteristics of the expected parameters, if any, that are passed in as arguments to the function call. For each parameter, if any, its name, data type, default position in the parameter list, and default value (to be substituted automatically if the associated parameter value is not supplied by the user in a particular function call within the command string) are also specified. It should be noted that parameters are not used to match tokens within commands. Instead, once a token is deemed to match a command in either the primary function storage (associated with operational commands) or the secondary function database (associated with commands involving data retrieval), the parameter list for the matched function is loaded and used to begin breaking down the parameters, if any, that are associated with the function to verify, among other things, that the parameters have been correctly specified by the user.

Referring to FIG. 3, following the operational function lookup step, data retrieval function lookup 307 is performed. In this step, the secondary function database is consulted by the parser, in an attempt to recognize all of the potential function names that were not natively known and stored within local function storage. Essentially, this includes all potential functions names which remain unresolved. The secondary function database will typically contain both a large number of functions relating to data retrieval, which require one or more data draws to be performed upon the read-only databases, as well as new functions that were expressly created by the user, either within the present command string, or during the processing of a prior command script submitted by the same user, or submitted by another user, such as another user within the same business organization as the current user. A user-defined function consists of the name representing the function, the signature describing the parameters accepted into the function, if any, and either the data store procedure which is used to perform the data retrieval operation, or a formula containing other functions. User-defined function parameters may be used to describe the nature and specifics of the data retrieval operation or may be used in a textual substitution within the formula of the function such that the function's formula is modifiable during execution. In a preferred embodiment, several thousand or more functions, including both predefined and user-defined functions, may be stored within the secondary function database.

For some function parameter values associated with the data store functions, well known or commonly used abbreviations are natively known to the parser. For example, for parameters expecting a date value, a value of zero may be used to specify the current date. Moreover, for parameters expecting a type of currency to be specified, USD is natively known to the parser to mean United States dollars.

For each predefined system function or user-defined function stored within the secondary function database, a function signature is stored, containing information similar in content and format to the signatures of functions contained within the local function storage. In a preferred embodiment, the secondary function database is a Microsoft SQL Server® database, and typically resides on a computer other than the web server on which the requesting parser is running. In order to determine whether an unresolved function name exists within the secondary function database, the parser invokes a pre-defined, stored procedure within the secondary function database, named GETFUNCTION( ). The GETFUNCTION( ) stored procedure will either return the signature, if the specified function name is known, or will return an indication that the specified function name is not stored within the secondary function database. In the example of FIGS. 4 and 5, the functions CA_SALES( ) and CQ_EPS( ) are system defined, rather than user-defined functions, having associated function signatures stored within the secondary function database. The first letter, C, in each function identifies a particular third-party source of financial data. In the first function, A_SALES indicates annual sales, while in the second function Q_EPS denotes quarterly earnings per share. The function lookup step is completed when all unresolved potential function names within the command script have been checked against the secondary function database. At this time, if any function names still remain unresolved, an error is deemed to have occurred, as the command script includes references to unknown functions, which cannot be executed. If this occurs, the command branch associated with the unresolved function name will not be executed. Other portions of the overall command script, associated with fully resolved command branches, may still be performed.

As shown in FIG. 3, after all function names capable of resolution have been resolved during function lookup, the next step is to create an execution plan 308. In this step, the parser consults the object hierarchy, which now includes fully verified and expanded function call references, and translates them into a series of execution chains. For example, some functions may be completely independent, relative to the remainder of the objects in the hierarchy, and can be immediately executed. Other functions, however, will have parameters or arguments specified that depend upon the evaluation of yet another function, requiring other functions to be executed before execution of the particular function can be performed. In the example of FIGS. 4 and 5, the SLOPE10( ) function cannot be run until the result of the CQ_EPS( ) function has been returned. Accordingly, a dependency chain is created, to insure that functions are not executed prematurely, before all of the elements identified within their associated parameter list are fully resolved.

To accomplish this, a tree data structure is created. For each element in the object hierarchy, a sub-tree including an ordered list of child nodes occurring beneath the parent element in the object hierarchy is created. Each child node has one of two types of classifications: a PRE classification, identifying that the child node is to be executed before the parent element; and POST classification, specifying that the elements of the child node are to be executed after the parent node. Next, this parent/child data structure is recursively executed in the following order: for each parent node, execute all of the contents of the PRE-classified child nodes; execute the current node; then execute all of the contents of the POST-classified child nodes.

As shown in step 310 of FIG. 3, once the execution plan is created, it is executed by the parser. To perform the execution plan, the parser will invoke appropriate procedures within the query processing database in order to perform the resolved functions from the command string, in the order specified by the execution plan. In general, many of the functions referred to in the execution plan will require data retrieval operations from the read-only databases, which are accessed via function calls to the intermediate query processing database. In a preferred embodiment, the underlying data retrieval operations are performed separately from the functions, such as financial analytics, that will operate on the retrieved data. This permits the creation of systems that are more decoupled in nature, and which are, accordingly, more readily expandable to encompass new, additional data retrieval functions.

Each individual operation in the overall execution plan is assigned a random results identifying number, or data ID. As each element in the object hierarchy is executed, functions which have child nodes will employ the Data IDs of their children to perform their specific operation. Such parent nodes will, in turn, generate a new data ID for their own result, which will be employed by their respective parent nodes, if any. The final operation, performed by a root node, will have no associated parent node. This final operation's Data ID will, accordingly, be associated with the final calculation for the overall associated tree structure. Next, in step 311, the web server informs the client that the results are ready, informing the client of both the identity of the results server, (i.e., the IP address of the secondary function database) where the results are to be retrieved from as well as the data's associated, final data ID, or results identifying number. Next, as shown in step 312, the client requests these results by sending the results identifying number to the specified IP address of the results server. These results are compressed, as shown in step 313, and returned to the client's computer, as shown in step 314. Finally, as shown in step 315, the client processes the results in any desired manner. For example, the client may generate graphs, charts, and/or textual information in order to present these results to the user. Alternatively, or in addition, the client application may use the returned data to populate cells in a spreadsheet software application associated with the plug-in making the data request via an API, or may produce a detailed report based upon the returned data.

This process of initially returning a pointer to the results, rather than the actual results themselves, is especially desirable where the client requesting data is remote from the web server parsing the command scripts and data servers producing the results. If, for example, there is a problem in data transmission, the resulting data can be immediately re-requested by the client, by again requesting the data using the results server's identity and the results identifying number that were previously sent to the client.

Although, as explained above, the command string received from the client may be one requesting data pulls and associated analytics, the present command scripting language and associated command scripts, or command strings, have other capabilities. For example, a client computer may, via an API call to the web server, use the syntax of the scripting language to create user-defined functions for later invocation. When such command strings are received, the specified user-defined functions and their associated function signatures are stored within the secondary function database, together with other user-defined functions, as well as other relatively less frequently used commands that are not natively known to the parser.

Figure 7:
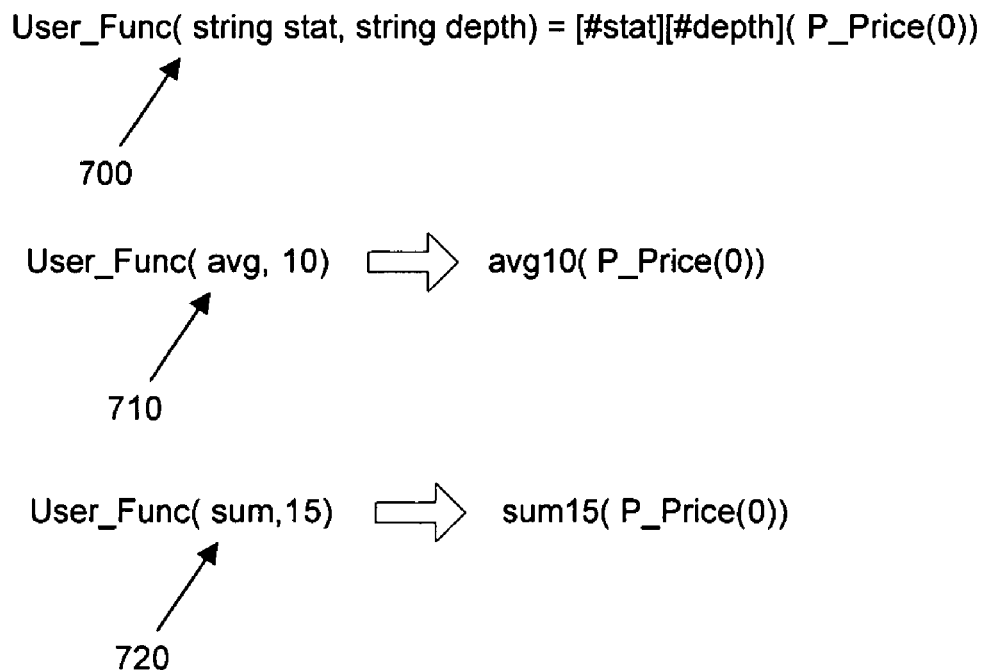
FIG. 7 of the drawings is an example of a user-defined function according to the present invention and showing, in particular, the text substitution feature of the scripting language.

An example of a user-defined function, showing, in particular, a flexible text substitution feature employed by the command scripting language recognized by the present parser, is shown in FIG. 7. As shown in FIG. 7, user-defined function User_Func( ) 700 is defined as having a signature including two string parameters, "stat" and "depth". In the present scripting language, whenever a variable preceded by a pound sign (#) and, together with the pound sign, enclosed by angle brackets is encountered by the parser, a direct text substitution of the specified variable's value is first substituted, and then decoded by the parser during the object hierarchy creation, semantic understanding, and function lookup steps. According to the specification of the user function User_Func( ) of FIG. 7, whenever this user function is encountered by the parser within a command string, it is replaced by the string content of the "stat" variable, concatenated with string content of the depth variable, concatenated with an open parenthesis, concatenated with a call to the P_Price(0) function, and concatenated with a close parenthesis. Command string samples 710 and 720 of FIG. 7 both reference the prestored user-defined function 700 and illustrate this textual substitution ability. Command string 710, where arguments avg and 10 are supplied in an invocation of the User_Func( ) function (as the "stat" and "depth" parameters, respectively), the parser substitutes these two parameter values in their specified positions within the user-defined function, to achieve the resultant text avg10(P_Price(0)). This substituted text, in turn, is further interpreted by the parser in a second interpretive pass of the command script, now including the substituted text, as a native, locally recognized function corresponding to the 10-day average for the specified parameter, in this case, the price of the current stock under consideration for the most recent 10 days.

As another example, the command string 720 is shown as again invoking the User_Func function, this time with the parameters "sum" and "15". This is decoded by the parser as the text sum, concatenated with text 15, concatenated with "(P_Price(0))". In this example 720, this decoded text is further recognized by the parser in a second interpretive pass of the command script now including the substituted text, as another function, stored within the secondary function database, as a 15-day sum of the specified parameter, again, in this case, the most current price for the stock under consideration.

As can be seen, this text substitution feature within the overall scripting language recognized by the parser provides a significant degree of flexibility for the user, permitting functions to be written that do not, in and of themselves, contain all of the necessary references to the functions that will be invoked. Instead, the functions can be specified within a parameter to the user-defined function. Moreover, the functions can be specified by a combination of multiple parameters to the user-defined function. In the example of FIG. 7, the User_Func function allows a subsequent user of this user-defined function, which may or may not be the author of the function, to separately specify a statistical operation, and a depth of days to be considered, to, in turn, specify a unitary internal function recognized by the parser during function lookup, such as "avg10" and "sum15".

Yet another feature of the present scripting language, and the associated parser, is a date engine 172 which, as shown in FIG. 2, exists within query processing database 171 and operates in conjunction with command parser 210. In many applications, such as financial research and analysis, almost all data retrievals are performed on a time basis. Date engine 172, in conjunction with the syntax of the command script, permits users to specify individual dates, a range of dates over a starting date and ending date period, as well as a particular interval, or frequency of data to be retrieved between the specified starting and ending date. The date engine allows for data to be retrieved using a number of specified calendars, such as a five-day calendar, and a seven-day calendar, which includes weekends. Moreover, country specific calendars, which exclude non-traded days, weekends, and holidays within specific Latin American, European, Asian, and African nations, for example, may be specified, wherein each calendar is adapted to the specific weekends, holidays, and other non-traded days by the national exchange of the country associated with the calendar.

In general, command strings are parsed and executed from the perspective of the current day. A date value of −10d, for example, means 10 days prior to the current day. However, in one aspect of the present invention, a Set_Run_Date( ) command may be invoked, in order to change the current date, for parsing and execution purposes, to a date other than today's date. Once this command is issued, all relative date specifications, such as −10d, are based on the run date that was set rather than today's date. This, in turn, allows queries to be run, and data to be pulled, from an historical perspective. This may be desirable, for example, when a particular query, which is regularly run, is accidentally omitted on a prior date. This also may be desirable in order to perform testing of a proposed new function against historical data, in order to verify the operation and accuracy of a new user-defined function using prior data as a test bed. Moreover, date engine 172 also allows users to adjust both start and end date specifications by moving forwards or backwards in time by using "date math". For example, "−1aw" is employed to "move backwards 1 actual week". Users may also lag time series, both uniformly (i.e., all dates move the same amount) or non-uniformly (i.e., date lagging varies for each point). Date engine 172 can also append discontinuous time series together to form one combined time series.

Among the date frequencies which may be specified and recognized by the date engine are daily, weekly, week-to-date, actual weeks, monthly, month-to-date, actual months, quarterly, fiscal quarter-to-date, yearly, fiscal year-to-date, as well as specific dates, such as a fully specified date, a particular month within a particular year, and relative dates. For example, a specified date of "−1/0/0" specifies one month ago from today. The "−1" value in the month portion of the date specifies one month prior to the current month, the "0" in the current day specifies today's date, and the "0" in the year specifies the current year. A date specification of "−1/−5/−3" specifies one month, 5 days and three years ago from today's date. A date specification of "12/31/−1" specifies December 31 of the prior year. The parser, in conjunction with the date engine, determines the date or collection of dates for which data is to be pulled, and builds this information into the execution plan that is ultimately run to retrieve data.

The foregoing description and drawings merely explain and illustrate the invention, and the invention is not limited thereto, except insofar as the appended claims are so limited as those skilled in the art having the present disclosure before them will be able to make modifications and variations therein without departing from the scope of the invention.

What is claimed is:

1. A computerized method for parsing and verifying the contents of a command script submitted for execution, comprising the steps of:
   providing a command script including at least one token and written in a scripting language;
   providing a first, substantially rapidly-accessible data store containing at least one primary function signature definition including a primary function name that is associated with an operational command that does not require data retrieval for completion, and a primary parameter list associated with the primary function name and having zero or more parameter specifications;
   providing a second data store that is less substantially rapidly-accessible than the first data store, the second data store containing at least one secondary function signature definition including a secondary function name that is associated with a command that requires data retrieval for completion, and a secondary parameter list associated with the secondary function name and having zero or more parameter specifications;
   recognizing at least one portion of the at least one token to potentially represent a reference to a previously defined function in the scripting language, the potential function reference having a potential function name and zero or more potential parameters associated therewith;
   searching the first data store for a matching primary function signature definition having a primary function name matching the potential function name and wherein each of the potential parameters has a matching entry in the primary parameter list associated with the same primary function signature definition; and
   searching the second data store for a matching secondary function signature definition having a secondary function name matching the potential function name and wherein each of the potential parameters has a matching entry in the secondary parameter list associated with the same secondary function signature definition, when a matching primary function signature definition is not found in the first data store.

2. The computerized method according to claim 1 further comprising the steps of:
   receiving the command script from a client application;
   constructing an execution plan including a scheduled execution of a function name determined to match the potential function name;
   performing the execution plan, the performance of the execution plan including the assembly of resulting data into a result set;
   storing the result set in association with a result set identifier on a result server;
   providing the result set identifier and an identification of the result server to the client application;
   receiving a request for the result set from the client application by the result server; and
   transmitting the result set from the result server to the client application in response to the request.

3. The computerized method according to claim 1 wherein the second data store comprises a relational database.

4. The computerized method according to claim 1, wherein the first data store and the second data store reside on separate computers, interconnected by a communications network.

5. The computerized method according to claim 1 wherein the command script is submitted for execution by a client application.

6. The computerized method according to claim 5 wherein the client application includes a spreadsheet program.

7. The computerized method according to claim 5 wherein the client application includes a web browser.

8. The computerized method according to claim 5 wherein the client application includes an application programming interface for constructing and submitting the command string for execution in response to calls made to functions exposed by the application programming interface.

9. The computerized method according to claim 1 wherein the reference to a previously defined function is a reference to a previously defined user-defined function.

10. The computerized method according to claim 1 wherein the reference to a previously defined function is a reference to a previously defined function that is native to the scripting language.

11. The computerized method according to claim 1, wherein the at least one token includes a plurality of tokens, further comprising the steps of:
    deconstructing the plurality of tokens into constituent components; and
    arranging the constituent components into an object hierarchy.

12. The computerized method according to claim 1, wherein the second data store is remote from the first data store.

13. The computerized method according to claim 1, wherein the second data store is remote from the computer executing the computerized method.

14. The computerized method according to claim 13, wherein the first data store is local to the computer executing the computerized method.

15. A computerized method for providing a user-extensible scripting language, comprising the steps of:
    storing a user-defined function written in the scripting language in a data store, the user-defined function including at least one parameter associated therewith, and a body portion including at least one substitution symbol indicating that the value of the at least one parameter is to be inserted as text in place of the substitution symbol;
    storing a function signature identifying characteristics of the user-defined function in the data store, the function signature including the name of the user-defined function and a specification of the at least one parameter;

recognizing a command script written in the scripting language to include a token containing a reference to the user-defined function and at least one parameter value associated therewith;

retrieving a copy of the body portion of the user-defined function referenced in the command string;

replacing the at least one substitution symbol within the copy with the at least one parameter value of the token;

reinterpreting the body of the copy of the user-defined function using the scripting language; and recognizing the body of the copy of the user-defined function to include a token comprising a reference to a function which was not present in the body of the user-defined function in the data store, whereby a run-time interpretation of the user-defined function is altered to include an invocation of a function that was not contained within the previously stored user-defined function.

16. The computerized method according to claim 15 wherein:

the at least one parameter of the user-defined function includes a first parameter and a second parameter;

the at least one substitution symbol of the user-defined function includes a first substitution symbol and a second substitution symbol, indicating that the values of the first and second parameters are to be inserted as text in place of the first and second substitution symbols, respectively;

the specification of the at least one parameter in the function signature includes a specification of the first and second parameters;

the at least one parameter value associated with the recognized token includes a first parameter value and a second parameter value; and the step of replacing the at least one substitution symbol within the copy with the at least one parameter value of the token comprises the step of replacing the first substitution symbol within the copy with the first parameter value of the token and replacing the second substitution symbol within the copy with the second parameter value of the token, whereby a run-time interpretation of the user-defined function is altered to include an invocation of a function, at least a portion of the name of the invoked function including the first parameter value and the second parameter value.

17. A computerized method for providing a user-extensible scripting language and parsing and verifying the contents of command scripts submitted for execution, comprising:

receiving the command scripts written in the scripting language, wherein the command scripts each include at least one token;

providing a first, substantially rapidly-accessible data store containing at least one primary function signature definition including a primary function name that is associated with an operational command that does not require data retrieval for completion, and a primary parameter list associated with the primary function name and having zero or more parameter specifications;

providing a second data store that is less substantially rapidly-accessible than the first data store, the second data store containing at least one secondary function signature definition including a secondary function name .that is associated with a command that requires data retrieval for completion, and a secondary parameter list associated with the secondary function name and having zero or more parameter specifications;

storing a user-defined function written in the scripting language in the second data store, the user-defined function including at least one parameter associated therewith, and a body portion including at least one substitution symbol indicating that the value of the at least one parameter of the user-defined function is to be inserted as text in place of the substitution symbol;

storing a third function signature identifying characteristics of the user-defined function in the second data store, the third function signature including the name of the user-defined function and a specification of the at least one parameter of the user-defined function;

recognizing at least a portion of the at least one token of a first command script to potentially represent a reference to a previously defined function in the scripting language, the potential function reference having a potential function name and zero or more potential parameters associated therewith;

searching the first data store for a matching primary function signature definition having a primary function name matching the potential function name and wherein each of the potential parameters has a matching entry in the primary parameter list associated with the same primary function signature definition;

searching the second data store for a matching secondary function signature definition having a secondary function name matching the potential function name and wherein each of the potential parameters has a matching entry in the secondary parameter list associated with the same secondary function signature definition, when a matching primary function signature definition is not found in the first data store;

recognizing the at least one token of a second command script as containing a reference to the user-defined function and the at least one parameter value associated therewith;

retrieving a copy of the body portion of the user-defined function referenced in the command string;

replacing the at least one substitution symbol within the copy with the at least one parameter value of the token;

reinterpreting the body of the copy of the user-defined function using the scripting language; and recognizing the body of the copy of the user-defined function to include a token comprising a reference to a function which was not present in the body of the user-defined function in the data store, whereby a run-time interpretation of the user-defined function is altered to include an invocation of a function that was not contained within the previously stored user-defined function.

* * * * *